Figure 1:
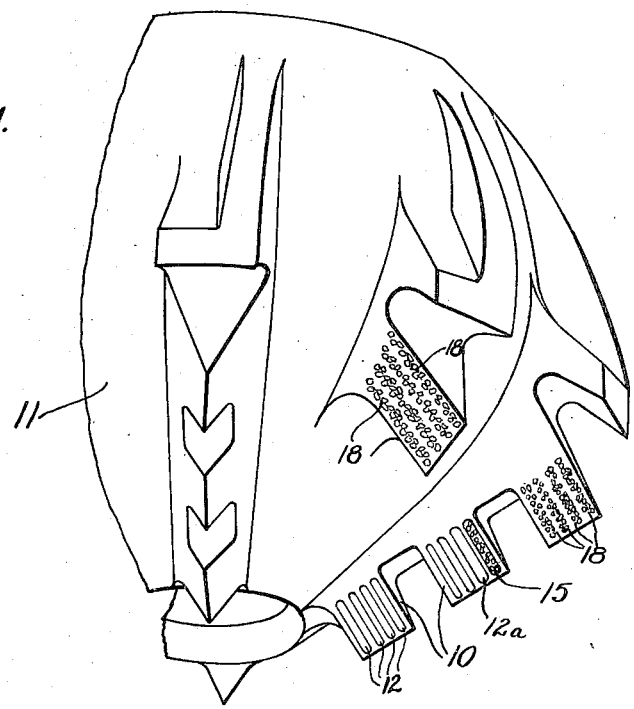

Oct. 27, 1936.  J. A. ZUBLIN  2,058,753
METHOD OF APPLYING WEAR RESISTANT MATERIAL TO A TOOL
Filed July 24, 1935

John A. Zublin
Inventor

Attorney

Patented Oct. 27, 1936

2,058,753

UNITED STATES PATENT OFFICE 2,058,753

METHOD OF APPLYING WEAR-RESISTANT MATERIAL TO A TOOL

John A. Zublin, Los Angeles, Calif.

Application July 24, 1935, Serial No. 32,909

4 Claims. (Cl. 76—108)

The present invention relates generally to welding methods, and more particularly to the manufacture of a tool with a hard, wear-resistant surface formed by applying to a softer metal body a facing of pieces of tungsten carbide or like material. The most commonly used materials are various commercial compounds of tungsten and carbon, often containing minor amounts of other elements, and referred to generically as tungsten carbide, in which sense the term is used herein. Because of the particular advantages presented to the application of tungsten carbide pieces to the cutting edges of oil well tools, I describe the invention as used therewith, but the invention in its broad aspect includes the application of any hard, wear-resistant particles to a tool.

It has been general practice to apply the pieces of tungsten carbide by means of a composite welding rod which takes the form of a heavy tube of mild or alloy steel filled with crushed tungsten carbide. The steel tube usually constitutes 25% to 40% of the gross weight of the rod and furnishes metal which is added during the welding procedure to attach the carbide particles to the metal body. In this way the carbide pieces and the added metal are deposited simultaneously as a facing over the base metal.

Because the density of tungsten carbide is about twice that of steel, a weld rod which is only one-third steel by weight is one-half steel by volume. This relatively large amount of soft metal, together with the molten steel from the drill bit or other body, tends to spread apart the pieces of tungsten carbide, and so makes it quite difficult to obtain a dense, compact facing. Further, it is almost impossible to work on small areas or on drill bit teeth where it is necessary to conform accurately to a definite, sharp outline, for the added metal builds up the cutting tooth too much and becomes unnecessary and troublesome. The minimum thickness of the tooth is determined by the metal required to prevent burning through during the facing, and is more than required by mechanical strength considerations alone. Thus, in bits having a rolling or slicing motion where it is necessary to have an accurately shaped tooth, the teeth are already as large or larger than desired and to add more metal during facing operations builds up a thick tooth of poor cutting efficiency.

When the heavy mild steel tube is placed in the welding flame to melt it, the tungsten carbide is also necessarily exposed to the flame for the time required to melt the tube. This flame applied to the carbide causes it to deteriorate and to lose its extreme hardness, and the necessary exposure of the tungsten carbide is sufficient to soften and destroy a material surface portion of the carbide. In fact, the tungsten carbide softens so much that, with the further heating encountered during the remainder of the welding process, a considerable amount of tungsten carbide alloys with the steel and thus has its hardness reduced to that of a steel alloy.

Various expedients have been used for applying tungsten carbide without adding metal during the welding, and have generally taken the form of non-metallic materials formed into tubes to hold the carbide pieces. If these carrier tubes are wholly or in part non-combustible, they have the disadvantage of contaminating the weld by introducing ash or other foreign substances into the molten metal. Light paper tubes, though almost entirely combustible, burn ahead of the welding torch and allow the particles of carbide to be either deposited in a greater quantitiy than desired or spilled and scattered, and in either event a large amount of expensive carbide is wasted. To some extent this difficulty has been overcome by the use of a binder such as sodium silicate, which cements together the particles of carbide while within the carrier tube; but the use of such a binder introduces a troublesome and expensive operation into the manufacture of carrier tubes filled with tungsten carbide pieces, and is also open to the objection that it introduces foreign substances into the weld.

Thus it becomes a general object of my invention to apply a layer or facing of tungsten carbide particles without adding any appreciable amount of metal from a welding rod.

Another object of my invention is to apply a layer of tungsten carbide particles without introducing into the weld foreign substances which do not combine or alloy with the base metal to which the facing is applied.

Another object is to deposit the particles of tungsten carbide with the minimum exposure to the welding flame so that the carbide pieces are deposited at as low a temperature as possible and retain their hardness without alloying with steel or deterioration caused by exposure to high temperatures.

A further object is to use a metallic tube for holding and carrying the carbide to the site of the weld but without providing sufficient metal in the carrier tube to weld together the applied particles of carbide.

This is accomplished in my invention by using a carrier tube made from such very thin sheet steel that it leaves practically no deposit, and, because of its shape, has sufficient mechanical strength to carry and hold the carbide. The metal of the body is locally melted to form a pool of molten metal into which the particles of tungsten carbide are deposited from the carrier tube so that when the metal solidifies the particles are firmly embedded in the body metal. Any material introduced into the weld by the tube readily combines with the base metal, and the material of the tube, being very thin, melts so rapidly that the pieces of carbide are deposited on the base metal before they have become heated to any extent by exposure to the welding flame.

Figure 2:
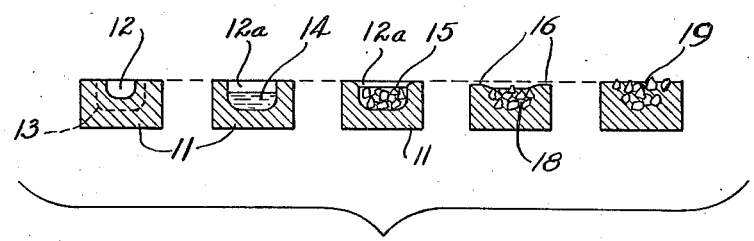

How the above and other objects and advantages of my invention are attained will be more readily apparent from the following description and the annexed drawing, in which:

Fig. 1 is a fragmentary view of a drill bit cutter, showing the preliminary grooves and the facing partially applied to the cutter teeth; and Fig. 2 is a series of enlarged diagrammatic sections showing from left to right various stages in the application of the carbide pieces to a portion of a cutter tooth having only a single groove.

A typical tube and a preferred method of making it are described in my copending application, made jointly with Charles W. Hitt, entitled, "Metal tube and method of making same", Ser. No. 32,908 filed on even date herewith, but any suitable tube may be used. I prefer to make the tube of sheet mild steel, only a few thousandths of an inch thick, very good results having been obtained with a tube made from .003 inch stock. This tube is filled with tungsten carbide particles of the desired size and held in by crimping the tube ends.

The tungsten carbide may be applied by any usual means, the electric arc and gas and atomic hydrogen torches having all been used with it. The atomic hydrogen torch, because of its very concentrated flame and extremely high temperature, which is above the melting point of tungsten carbide, is particularly adapted to certain types of work, but successful results have not heretofore been obtained in the application of tungsten carbide as a hardfacing material for tools. The intense heat of the atomic hydrogen flame, for the time necessarily involved in previously known methods, destroyed the hardness of the carbide so that the results obtained were distinctly inferior to those obtained with gas or electric apparatus. For this reason the present invention finds a particular use in connection with the atomic hydrogen torch because the carbide undergoes no material decrease in hardness.

I prefer, although it is not necessary, that at the beginning of the operation the portions or teeth 10 of the tool 11 to be faced be provided with a series of shallow grooves 12, as shown on the cutter teeth in Fig. 1, and in the first or left-hand section in Fig. 2. These grooves may be pre-formed as by casting or may be preliminarily cut with an oxy-acetylene cutting torch, and are about 1/8" in width and about the same or less in depth, the exact dimensions varying according to the size of the tool and size and amount of the tungsten carbide particles to be applied. In addition to the advantages described below, these grooves serve as guides to the operator who, because of his dark glasses, has a limited field of vision.

Beginning with the first diagram at the left of Fig. 2, the successive steps in the application of tungsten carbide particles are shown. As the first step, the sides and bottom of groove 12, as indicated by the dotted line 13 around the groove, are melted by the application of any suitable source of heat, the atomic hydrogen torch being preferred for this process. By this step of melting down the sides and bottom of groove 12, there is formed an enlarged groove 12a containing at its bottom a pool of molten base metal 14. Particles of tungsten carbide from the carrier tube are then introduced into this pool 14 of base metal by melting a portion of the tube, preferably with the welding torch. The carbide particles, being much more dense than the liquid steel, sink to the bottom of the pool; and a sufficient quantity of carbide particles is added to raise the level of the molten metal by displacement to nearly the original level of the cutting tooth at the top of the groove, as shown at 15 in Fig. 2. Thus the volume of metal removed when forming the original groove 12 should approximately equal the volume of tungsten carbide to be filled in the groove during the facing operation. During these steps and during the finishing of the operation, the metal at the sides of the pool will become somewhat melted and flow over into the pool, so that finally the surface of the tool will be somewhat lower than the original surface, as shown at 16. Finally, the molten metal is allowed to cool and harden around the pieces of deposited tungsten carbide so that they become firmly embedded in the solidified base metal and form a compact aggregation 18 of hard, wear-resistant particles embedded in a matrix of base metal.

As will be seen from Fig. 2, the level of the top surface of a tooth is not raised by the application of the tungsten carbide particles to the tooth, and usually the level is somewhat lowered as a result of slightly melting down the metal surrounding the grooves in the tooth. In this way the original outline of each tooth is preserved and the final tooth is made to conform accurately to the desired shape. If a large amount of metal were added to the top of the tooth it would not be possible to maintain this accurate outline, nor would it be possible to maintain the very sharp cutting edge on the tooth, which is essential to the drilling efficiency of cutters of this type. However, if a very large aggregation 19 is formed by adding an excess amount of particles to the pool so that the metal in effect overflows, then the carbide particles will extend to the original height of the top surface and will tend to spread out on each side of the groove, as shown in the right-hand diagram of Fig. 2.

Grooves 12 lie at right angles to the cutting edge of the teeth, and the torch is first applied to the end of the groove near the cutting edge. A small pool of molten metal is there formed, and the pool is extended along the groove away from and at right angles to the cutting edge by melting down base metal at the rim of the already molten pool to form the enlarged groove 12a. In this way the pool, and the final aggregation 18 of carbide particles, lies with its long dimension perpendicular to the cutting edge. Tungsten carbide pieces are added as the pool is extended to fill the groove, and as the pool lengthens, a part previously molten will cool and harden while the new metal is being melted. Grooves 12 are filled in one at a time in succession, so that to fill a series of grooves the tool is melted at spaced intervals, and the pools 14 so formed, as well as the final aggregations 18, are separated by narrow ribs of body metal.

The thin-wall carrier tube will typically have a wall thickness of .002–.004 inch; and such a tube is so thin that it melts in the welding flame instantaneously; however, the tube being metallic does not burn ahead of the flame and permits the operator to very accurately control the amount and position of the carbide pieces deposited, thus enabling him to hold his work within the necessary limits of a very small fraction of an inch.

Though readily alloyable with the base metal, the amount of steel deposited from a tube having a wall thickness of only a few thousandths of an inch is negligible, and for all practical purposes is non-existent. This condition is well shown by the example of a ¼" tube made of .003 inch stock and filled with tungsten carbide pieces passing an 8-mesh screen but retained on a 10-mesh screen. This typical tube when filled contains about 94% carbide by weight, leaving only about 6% for the tube itself. From the above, it will be seen that a ¼ inch tube having a wall thickness of .002 inch contains about 4% by weight of metal, and similarly a tube of .004 inch contains about 8% of metal. The exact percentages will vary with the tube diameter, wall thickness, and the size of the carbide pieces. By depositing this filled tube on a carbon or other non-metallic block, it will be found that the quantity of steel deposited is not sufficient even to loosely bind together the carbide pieces. Actual analysis shows that the metal added to the tool amounts to less than 6% of the original filled tube, a large part being lost during the application of the carbide pieces.

Changes may be made in the various procedural steps and in the tools and materials used without departing from the spirit and scope of my invention, so that the preceding description is to be considered as illustrative of rather than limitative upon the claims appended hereto.

I claim as my invention:

1. The method of embedding particles of hard wear-resistant material in the cutting edge of a tool, that includes forming a groove in a portion of the tool and melting a portion of the tool body to form a pool of molten base metal in the bottom of said groove, melting a portion of a very thin-wall metallic carrier tube supporting a number of particles of hard wear-resistant material and depositing the hard particles from the carrier tube into the molten pool of base metal, the added metal from the carrier tube being 8% or less by weight of the deposit, and allowing the molten base metal to cool and solidify about the filled in hard particles to hold them firmly embedded in the metal of the tool body.

2. The method of embedding particles of hard wear-resistant material in the cutting edge of a tool, that includes forming a groove in a portion of the tool and melting a portion of the tool body to form a pool of molten base metal in the bottom of said groove, melting a portion of a very thin-wall metallic carrier tube having a wall thickness of about .002 to .004 inch and supporting a number of particles of hard wear-resistant material and depositing the hard particles from the carrier tube into the molten pool of base metal, the added metal from the carrier tube being about 4% to 8% by weight of the deposit, and allowing the molten base metal to cool and solidify about the filled in hard particles to hold them firmly embedded in the metal of the tool body.

3. The method of embedding particles of hard wear-resistant material in the cutting edge of a tool, that includes forming a plurality of grooves in a tool body at spaced intervals and melting portions of the tool body to form pools of molten base metal in said respective grooves; as each pool is formed, melting a portion of a very thin-wall metallic carrier tube supporting a number of particles of hard wear-resistant material and depositing the hard particles from the carrier tube into the molten pool of base metal, the added metal from the carrier tube being 8% or less by weight of the deposit, and allowing the molten base metal to cool and solidify about the deposited hard particles to hold them firmly embedded in the metal of the tool body.

4. The method of embedding particles of hard wear-resistant material in the cutting edge of a tool, that includes forming a plurality of grooves in a tool body at spaced intervals and melting portions of the tool body to form pools of molten base metal in said respective grooves; as each pool is formed, melting a portion of a very thin-wall metallic carrier tube having a wall thickness of about .002 to .004 inch and supporting a number of particles of hard wear-resistant material and depositing the hard particles from the carrier tube into the molten pool of base metal, the added metal from the carrier tube being about 4% to 8% by weight of the deposit, and allowing the molten base metal to cool and solidify about the deposited hard particles to hold them firmly embedded in the metal of the tool body.

JOHN A. ZUBLIN.